UNITED STATES PATENT OFFICE.

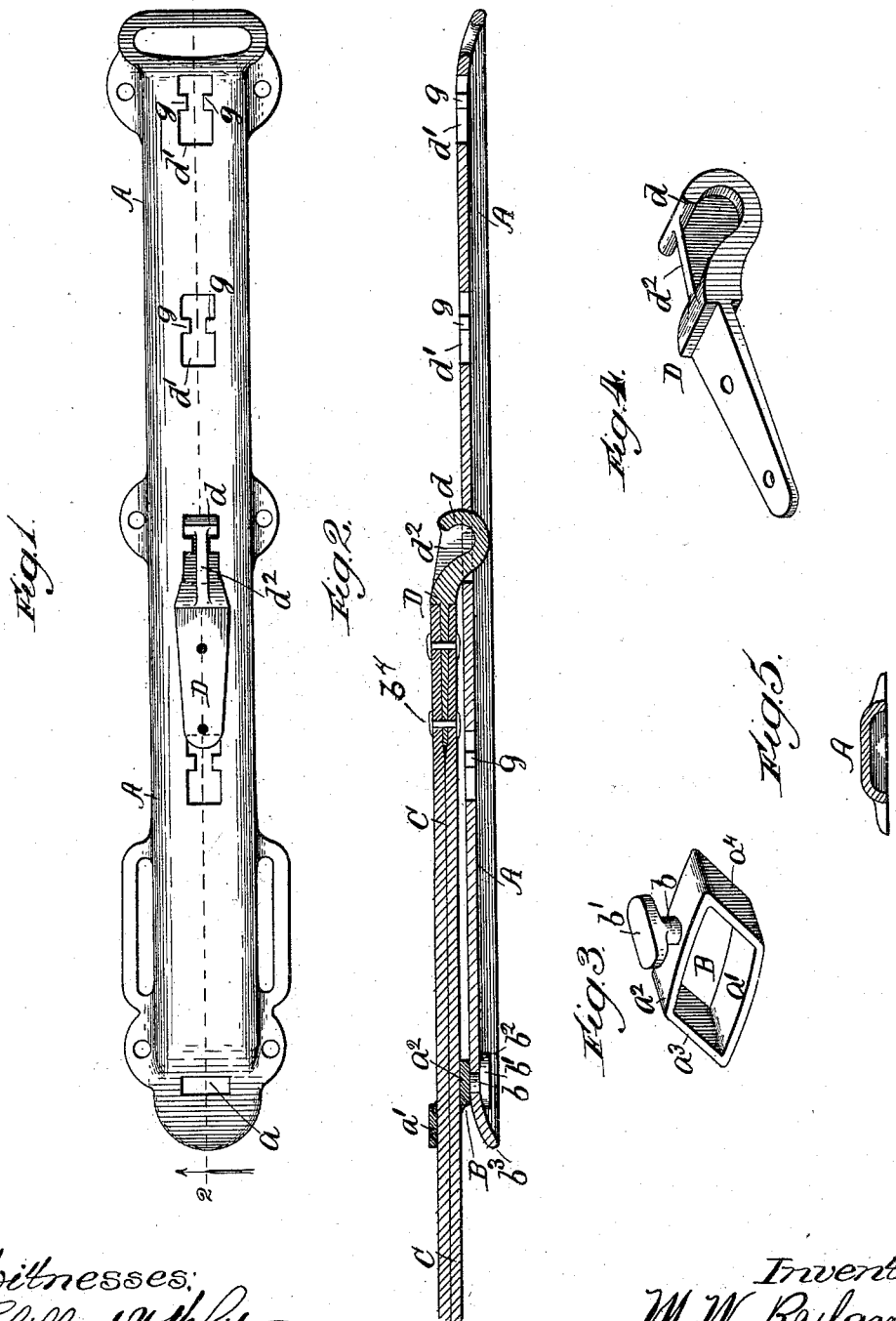

MARION W. RYLAND, OF WARSAW, INDIANA, ASSIGNOR TO CHARLES J. KEEN, OF TOLEDO, OHIO.

HAME-TUG.

SPECIFICATION forming part of Letters Patent No. 487,379, dated December 6, 1892.

Application filed February 2, 1892. Serial No. 420,096. (No model.)

*To all whom it may concern:*

Be it known that I, MARION W. RYLAND, a citizen of the United States, residing at Warsaw, in the county of Kosciusko and State of Indiana, have invented certain new and useful Improvements in a Hame-Tug Connection, of which the following is a full, clear, and exact description, that will enable others to make and use the same, reference being had to the accompanying drawings, forming a part of this specification, in which—

Figure 1 is an elevation, looking at the outside. Fig. 2 is a longitudinal section on line 2, Fig. 1, showing a broken-away part of a tug or trace attached; Figs. 3 and 4, detached details; and Fig. 5, a transverse section on line 5, Fig. 1, looking in the direction indicated by the arrow.

This invention relates to an improved device forming a connection between the tug or trace and hames, and has for its object to provide an arrangement whereby the durability of a tug will be greatly increased and the convenience of adjustment facilitated.

In the drawings, A is a connecting-plate, which will ordinarily be composed of metal. This plate is provided at the back end with the rectangular or elongated transverse aperture or slot $a$.

B is a detachable loop-frame consisting of the two cross-bars $a'$ $a^2$ and the end bars $a^3$ $a^4$. The end bars are set diagonally, so as to bring the cross-bars in different planes, as shown in Figs. 2 and 3. This form of construction provides for a larger bearing on the tug-leather and renders the same less liable to be broken in the loop. The cross-bar $a^2$ of the loop-frame is provided with the downwardly-projecting stem $b$, terminating in the elongated locking-head $b'$. This head is beveled on its bearing-surface, as $b^2$, to lessen the frictional contact with the plate and ease the automatic adjustment of the loop. This end of the plate is curved inwardly slightly, as at $b^3$, to prevent the tug from having a wearing or breaking contact. When the loop is in place with reference to the plate, the elongated locking-head lies parallel therewith, so that it is not possible for the same to be accidentally disengaged. The elongated slot $a$ permits of the loop having a free movement from side to side and its pivotal connection with the plate allows it to turn in its bearing and also have a slight lateral play, so that the same has a universal automatic adjustment and will conform to the movements of the animal and relieve the tug of all stiffness and strain, and thereby greatly lengthen the service of the same.

The tug C passes through the detachable loop and is secured to the shank end of the detachable clip D by means of one or more rivets $b^4$. On the front end of this clip is formed the hook $d$, which is adapted to be inserted in any one of the elongated apertures $d'$ in the plate. This hook is quite wide, as shown, and is provided on the outer or concave side with a strengthening-rib $d^2$. The lugs $g$ $g$ extend part way across the apertures $d'$ and stop just short of the rib $d^2$ and serve to prevent the hook from being accidentally disengaged.

I am aware of the subject-matter set forth in Patent No. 258,267, of May 23, 1882, relating to improvements in drive-chains, and I do not broadly claim any of the features shown therein.

Having thus described my invention, what I claim as new, and desire to secure by Letters Patent, is—

1. In a hame-tug, the combination of a connecting-plate having a transverse elongated slot in the back end thereof and a tug loop or frame consisting of two cross-bars and two connecting end bars set diagonally, so as to bring the cross-bars in different vertical planes, one of said cross-bars being provided with a projecting stem having an elongated head and engaging loosely with said slotted plate, substantially as set forth.

2. In a hame-tug, the combination, with a connecting-plate provided with a transverse slot in the back end and a number of elongated apertures throughout its length, of a tug-loop loosely engaging with said transverse slot and a detachable trace-clip having a hook at one end with a strengthening-rib on the concave side thereof, said hook being adapted to be inserted in any of said apertures and prevented from becoming accidentally disengaged therefrom by stop-lugs, substantially as set forth.

MARION W. RYLAND.

Witnesses:
L. M. FREEMAN,
L. B. COUPLAND.